United States Patent [19]

Boggs

[11] 4,301,920
[45] Nov. 24, 1981

[54] GAME-FISH PRESERVING DEVICE

[76] Inventor: John N. Boggs, P.O. Box 1618, Panama City, Fla. 32401

[21] Appl. No.: 120,683

[22] Filed: Feb. 11, 1980

[51] Int. Cl.$^3$ .................... A63D 55/00; B65D 85/00
[52] U.S. Cl. ........................... 206/315 R; 150/52 R
[58] Field of Search ...................... 206/315; 150/52 R

[56] References Cited

U.S. PATENT DOCUMENTS

| Re. 24,600 | 2/1959 | Ziff ................................... 150/52 R |
| 1,576,488 | 3/1926 | Hodgson ........................... 150/52 R |
| 3,941,159 | 3/1976 | Toll ................................... 150/52 R |
| 4,142,565 | 3/1979 | Plunkett, Sr. ..................... 150/52 R |
| 4,197,890 | 4/1980 | Simko ............................... 150/52 R |
| 4,201,817 | 5/1980 | Duncan, Jr. ...................... 150/52 R |

FOREIGN PATENT DOCUMENTS 574227 2/1976 Switzerland ..................... 150/52 R Primary Examiner—Joseph Man-Fu Moy
Attorney, Agent, or Firm—Bailey, Dority & Flint

[57] ABSTRACT

A bag device for preserving and protecting game-fish with primary application to billfish and the like is disclosed as including a layered insulating sheathing which is foldable about a fold line for enclosing and insulating the main body of the fish in ice with the design and capability for allowing the bill, fin and tail portions thereof to extend beyond the enclosure. Velcro fastening tape carried around the periphery of the sheath and fold line thereof effectively seals the main body portion therein and around the extended portions of the fish to avoid loss of cooling.

4 Claims, 4 Drawing Figures

U.S. Patent   Nov. 24, 1981   4,301,920
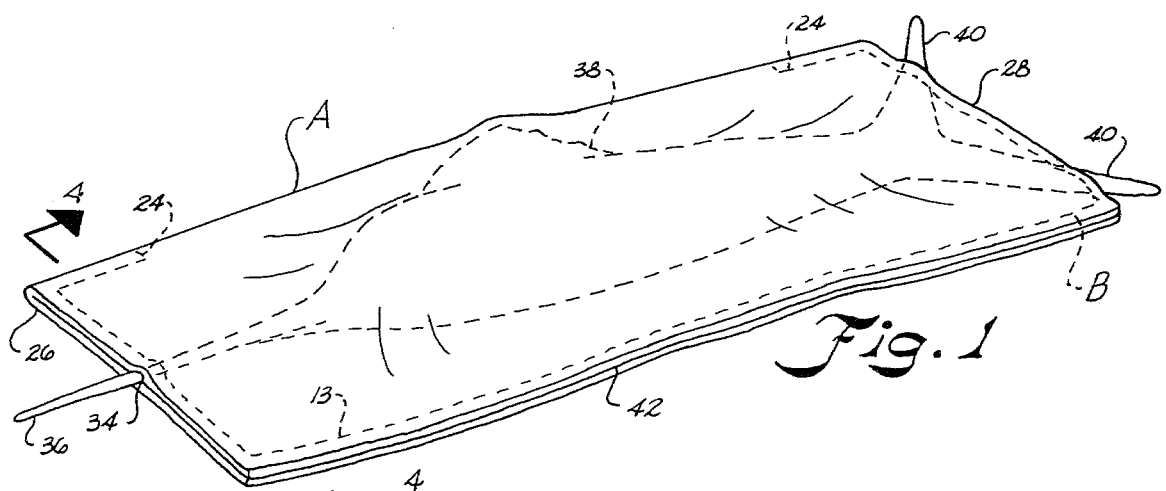
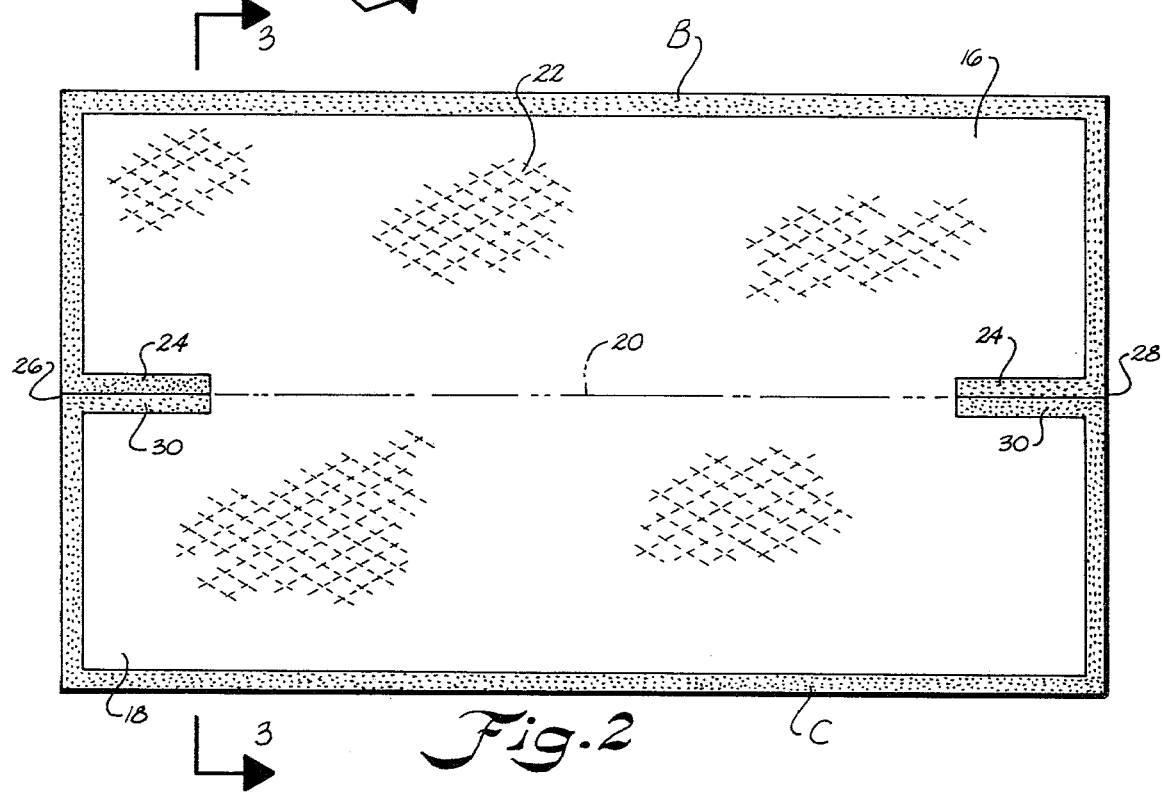
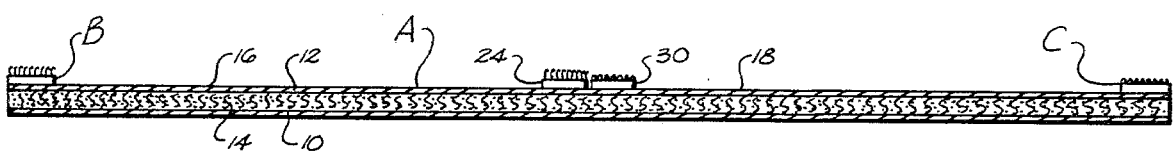
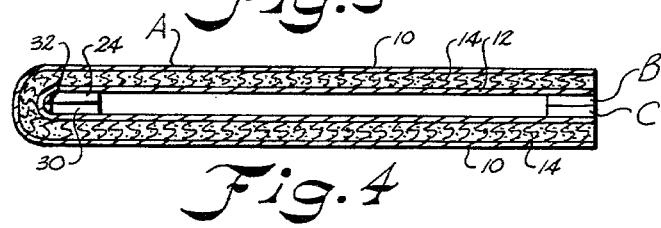

GAME-FISH PRESERVING DEVICE

BACKGROUND OF THE INVENTION

Sport fishing is an increasingly popular sport in and around coastal areas wherein tournament competition is held mainly for blue marlin, sailfish, swordfish, white marlin, and the like, all of which are members of the billfish family of fishes. Fishing may well take place twenty to sixty miles from shore which means that the fish must be stored in refrigeration or ice if it is to be preserved in weight, appearance and edibility. Normally, however, the size boat utilized in sportfishing does not afford enough space for a large fishbox that would be required to contain such a fish which commonly vary in length from seven to twelve feet. Particularly, the bills, the fins, and tails of such fish make it extremely difficult to place such fish in refrigerated containers. Furthermore, the cost of such a container would be almost prohibitive due to the size required. The degree of dehydration often determines the winning weight in competition. The only alternative is to return to port after each days catch to avoid spoilage and this requires considerable amounts of fuel and related expenses.

SUMMARY OF THE INVENTION

Accordingly, an important object of the present invention is to provide an insulated sheath enclosure which will accommodate different size game-fish for preserving their weight, appearance and edibility.

A further object of the invention is to provide an insulated bag for game-fish which is inexpensive yet affords adequate insulation to allow for overnight and multiple day trips avoiding the need to return to port after each days catch.

It has been found according to the invention, that a device for preserving game-fish in ice can be had by providing an elongated flexible insulated sheathing which includes first and second sides defined by a foldline about which the sheathing is foldable. Velcro hook fastener tape is carried around the periphery of the first side and Velcro loop fastener tape is carried around the periphery of the second side whereby the sheathing may be sealed about its periphery with the capability for the bill, fin, and tail portions of the fish to extend from the sheathing with the Velcro fastening tapes forming a tight seal around the extended portions to maintain its insulation and cooling.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof wherein an example of the invention is shown and wherein:

FIG. 1 is a perspective view illustrating a game-fish preserving device constructed according to the present invention in a folded and sealed configuration, FIG. 2 is a plan view illustrating a game-fish preserving and protection device according to the invention with the insulated sheathing thereof in an unfolded configuration, FIG. 3 is a sectional view taken along line 3—3 illustrating the layered construction of the insulated sheathing and means for fastening and sealing the sheathing according to the invention, and FIG. 4 is a sectional view taken along line 4—4 of FIG. 1.

DESCRIPTION OF A PREFERRED EMBODIMENT

The invention relates to a device for preserving, in ice, the weight, appearance, and edibility of a game-fish such as a billfish, swordfish, sailfish, marlin and the like. The drawings disclose a preferred embodiment of the device wherein an elongated flexible sheathing A is provided having first and second spaced ends. The sheathing includes first and second layers of a water impermeable material. An intermediate layer of an insulated material is carried between the first and second layers of the sheathing. The sheathing includes a foldline which defines first and second sides of the sheathing on respective opposing sides of the foldline. Velcro hook fastener tape is carried around the periphery of the first side of the sheathing and Velcro loop fastener tape is carried around the periphery of the second side of the sheathing. The sheathing is foldable about the foldline for enclosing the game-fish with bill, fin, or tail portions extended from the sheathing enclosure. The Velcro fastening tapes seal the entire periphery of the folded sheathing and form a tight seal about any extended portions of the game-fish whereby fish of different lengths and sizes may be accommodated within the folded sheathing and insulated effectively therein.

Referring now in more detail to the drawing, the sheathing includes a first layer 10 which is preferably a suitable water impermeable material and a second layer 12 of such material. An intermediate layer 14 of a suitable insulating material is disposed between the layers 10 and 12. The sheathing includes a first side 16 and a second side 18 defined on respective opposing sides of a foldline 20. The layers 10 and 12 with insulating layer 14 sandwiched therebetween may be quilt-stitched such as illustrated at 22 so that the insulating material will not shift in the sheathing enclosure to provide for uniform insulation. Layers 10 and 12 may be a suitable vinyl material such as a nylon reinforced vinyl fabric sold under the brand name Facilon manufactured by the Sun Chemical Corporation of Paterson, New Jersey. The insulating material 14 may be any suitable material such as Rubbertex insulation. Stitching 22 may be waterproof so that the entire sheathing is substantially impermeable to water.

As illustrated, the Velcro hook material B is carried around the entire outer periphery of the first side 16 and the Velcro loop material C is carried about the entire outer periphery of second side 18. A strip of Velcro hook tape 24 is carried generally parallel and adjacent to the foldline 20 on the side 16 of the sheathing at the first and second ends 26 and 28, respectively. A strip of Velcro loop tape 30 is carried generally parallel and adjacent to the foldline 20 on the second side 18 of the sheathing at first and second ends 26 and 28 thereof. The Velcro fastening tapes 24 and 30, respectively seal the folded sheathing at fold 32 thereof about the foldline 20 at the ends 26 and 28 to maintain the insulating effect of the sheathing. The first layer 10 which forms the exterior of the sheathing enclosure when folded is preferably a white or other like colored material to provide a light reflecting surface to maintain the inside cool.

The bag is normally constructed to have the dimensions when folded of 8 feet in length and 3 feet in width. This will accommodate a number of different size game-fish with the Velcro fastening tapes producing a tight seal such as at 34 around the extended bill portion 36 of the billfish illustrated herein at 38. Likewise, at the opposing end of the sheath, a tight seal is formed about extended tail portions 40 of the billfish. When the side fins are of such size as to extend from the sheathing enclosure such may be made to extend from the open side 42 thereof and effectively sealed by Velcro tape. The sheath thus sealed avoids loss of cooling from the ice contained therein.

Thus, it can be seen that a highly advantageous construction can be had for a device which preserves the weight, appearance and edibility of large game-fish without the need for a large conventional fishbox which may be utilized on small fishing boats that cannot accommodate large fishboxes due to size and expense. The device may be easily cleaned and has been found to hold ice remarkably well.

While a preferred embodiment of the invention has been described using specific terms, such description is for illustrative purposes only, and it is to be understood that changes and variations may be made without departing from the spirit or scope of the following claims.

What is claimed is:

1. A game-fish preserving and protection device comprising:
    an elongated flexible sheathing having first and second ends;
    said sheathing including an insulating material;
    said sheathing having a fold line to define first and second sides of said sheathing on respective opposing sides of said fold line;
    Velcro hook fastener tape carried around the periphery of said first side and end of said sheathing;
    Velcro loop fastener tape carried around the periphery of said second side and end of said sheathing;
    said sheathing being foldable about said fold line for enclosing said game-fish with bill, fin, or tail portions extended from said sheathing enclosure; and
    said Velcro fastening tape sealing the entire periphery of said folded sheathing and forming a tight seal about said extended portions of said game-fish;
    whereby game-fish of varying length and sizes may be accommodated within said folded sheathing and insulated effectively therein.

2. The device of claim 1 wherein said insulated sheathing includes first and second spaced layers of a water impermeable material and an intermediate layer of said insulating material carried between said first and second layers.

3. The device of claim 1 including Velcro hook fastening tape carried generally parallel adjacent said fold line on said first side of said sheathing at said first and second ends thereof, and Velcro loop fastening tape carried generally parallel adjacent said fold line on said second side of said sheathing at said first and second ends thereof, said Velcro fastening tapes effectively sealing said folded sheathing at said fold thereof about said fold line at said first and second ends to maintain the insulating effects thereof.

4. The device of claim 1 wherein said first layer of material includes a light reflective surface forming the exterior of said sheathing enclosure when folded.

* * * * *